US010694271B2

(12) United States Patent
Sen et al.

(10) Patent No.: US 10,694,271 B2
(45) Date of Patent: Jun. 23, 2020

(54) SYSTEMS AND METHODS FOR DECOUPLED OPTICAL NETWORK LINK TRAVERSAL

(71) Applicant: Infinera Corp., Annapolis Junction, MD (US)

(72) Inventors: Santanu Sen, Bangalore (IN); Thirumala Raju Mone, Bangalore (IN)

(73) Assignee: Infinera Corporation, Sunnyvale, CA (US)

(*) Notice: Subject to any disclaimer, the term of this patent is extended or adjusted under 35 U.S.C. 154(b) by 0 days.

(21) Appl. No.: 16/136,810

(22) Filed: Sep. 20, 2018

(65) Prior Publication Data

US 2020/0100003 A1    Mar. 26, 2020

(51) Int. Cl.
*H04Q 11/00* (2006.01)
*H04L 12/715* (2013.01)
*H04L 12/721* (2013.01)

(52) U.S. Cl.
CPC ......... *H04Q 11/0067* (2013.01); *H04L 45/38* (2013.01); *H04L 45/64* (2013.01); *H04Q 2011/0073* (2013.01); *H04Q 2011/0077* (2013.01); *H04Q 2011/0088* (2013.01); *H04Q 2011/0096* (2013.01)

(58) Field of Classification Search
CPC combination set(s) only.
See application file for complete search history.

(56) References Cited

U.S. PATENT DOCUMENTS

| 9,301,026 | B2* | 3/2016 | Srinivas | H04Q 3/0083 |
| 9,301,028 | B2* | 3/2016 | Wang | H04J 14/0268 |
| 2002/0042870 | A1* | 4/2002 | Rocray | G06F 9/4405 712/10 |
| 2003/0215232 | A1* | 11/2003 | Jahn | H04J 14/02 398/41 |
| 2005/0030951 | A1* | 2/2005 | Maciocco | H04Q 11/0066 370/395.2 |
| 2006/0013149 | A1* | 1/2006 | Jahn | H04J 14/02 370/254 |
| 2009/0245289 | A1 | 10/2009 | Sprague | |
| 2009/0285097 | A1* | 11/2009 | So | H04Q 11/0062 370/235 |
| 2012/0005371 | A1* | 1/2012 | Ravindran | H04L 45/50 709/242 |

(Continued)

*Primary Examiner* — Omar S Ismail
(74) *Attorney, Agent, or Firm* — David L. Soltz

(57) ABSTRACT

Methods and systems are disclosed for optical network link traversal, including a method comprising the steps of receiving, by a traverser software module for an optical network, from a first node in a network link defining a path in the optical network, one or more node sets indicative of one or more of a second node also in the network link; determining, with the traverser software module, an order of traversal of the one or more node sets; traversing the network link using the determined order of traversal; communicating, by the traverser software module, information with a feature manager software module for a first software feature, the first software feature configured to perform a function specific to a specific node; and triggering, by the feature manager software module, the first software feature to execute one or more computer executable instruction based on information from the traverser software module.

17 Claims, 10 Drawing Sheets

(56) References Cited

U.S. PATENT DOCUMENTS

| | | | |
|---|---|---|---|
| 2013/0259465 A1* | 10/2013 | Blair | H04B 10/27 398/2 |
| 2014/0105039 A1* | 4/2014 | McDysan | H04L 45/306 370/252 |
| 2014/0105062 A1* | 4/2014 | McDysan | H04L 45/306 370/254 |
| 2014/0105216 A1* | 4/2014 | McDysan | H04L 67/1095 370/400 |
| 2015/0063802 A1* | 3/2015 | Bahadur | H04L 47/125 398/49 |
| 2015/0256253 A1* | 9/2015 | Bottari | H04J 14/0268 398/28 |
| 2016/0149788 A1* | 5/2016 | Zhang | H04L 43/10 709/224 |
| 2016/0173338 A1* | 6/2016 | Wolting | H04L 41/145 709/223 |
| 2017/0093487 A1* | 3/2017 | Grammel | H04J 14/021 |

* cited by examiner

US 10,694,271 B2

SYSTEMS AND METHODS FOR DECOUPLED OPTICAL NETWORK LINK TRAVERSAL

FIELD OF THE DISCLOSURE

The disclosure generally relates to methods and apparatuses that control and implement link-level traffic engineering through optical communication networks. More particularly the disclosure relates to modular link-level traversal for optical networks separated from feature business logic. Though the methodologies set forth herein are in the context of exemplary based traffic engineering (TE) routing for optical communication networks, such methodologies may be applied to any interface/network that supports network linking.

BACKGROUND

Traffic Engineering (TE) is a technology that is concerned with performance optimization of operational networks. In general, Traffic Engineering includes a set of applications mechanisms, tools, and scientific principles that allow for measuring, modeling, characterizing and control of data traffic in order to achieve specific performance objectives.

Generally, optical networks comprise a collection of interconnected heterogeneous termination points. The characteristics of interconnections among different termination points may vary widely. A network solution provider is often required to implement a number of features that operate on the network for retrieval, propagation, injection, and processing of information. However, the termination points, their interconnections, and the features that need to operate on the termination points may differ from one another. Because of these differences, prior systems required the development and use of feature-specific and link-specific modules, which are difficult to reuse. Commonly, designers would design network link-level features focusing on the details of the features and the nature of the link (between or inside network devices) on which it operates. However, this resulted in development of software modules which have the business logic of the feature strongly coupled with the mechanism of retrieval, propagation, and injection of feature specific information in a link specific manner.

Extending the same feature over new sorts of network links, or even new types of termination points and interconnections in an existing network link, necessitated modification and verification of the existing software modules. In addition, as the software modules were changed to add more and more network link specific code, readability and maintainability of the feature business logic degraded. As a consequence, a new feature could not reuse the software modules of any of the existing features even if the features operated on the same network.

What is needed are systems and methods that separate link-level traversal from feature-based implementation in order to create easily maintainable and reusable systems for link-agnostic retrieval, propagation, and/or injection of information in heterogeneous networks, and that also allow swift implementation and simple fault ("bug") isolation.

SUMMARY

Systems and methods are disclosed. The problems of feature-specific implementation, modification, and verification of software modules in optical networks are addressed with systems and methodologies for feature-agnostic decoupled optical network link traversal for link-agnostic retrieval, propagation, and/or injection of information in heterogeneous networks.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

Figure 1:
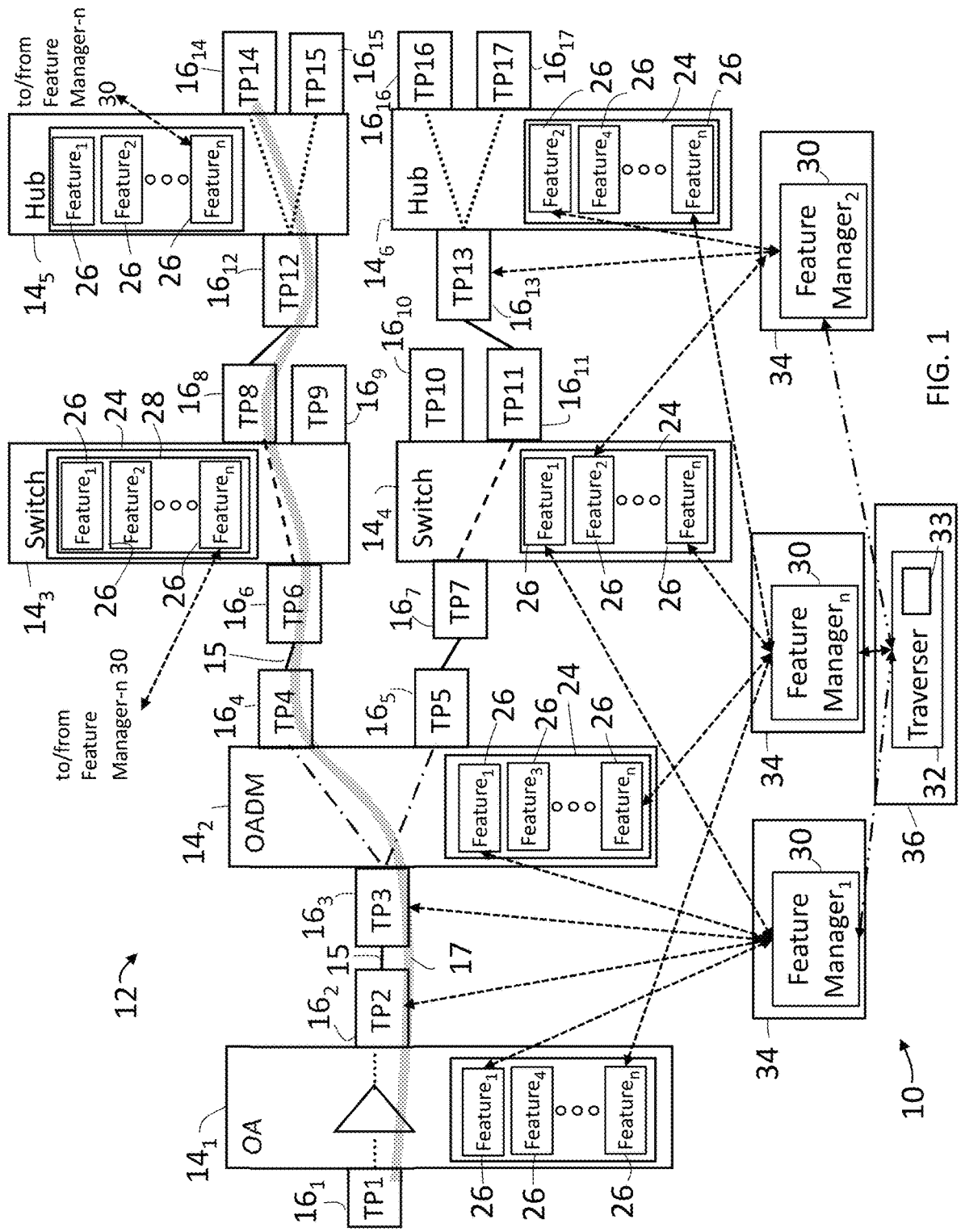
FIG. 1 is a schematic of an exemplary embodiment of a system in accordance with the present disclosure.

The following detailed description refers to the accompanying drawings. The same reference numbers in different drawings may identify the same or similar elements.

The mechanisms proposed in this disclosure circumvent the problems described above. In one exemplary embodiment, a link traversal method may comprising the steps of: receiving, by a traverser software module for an optical network, from a first node in a network link defining a path in the optical network, one or more node sets indicative of one or more of a second node also in the network link defining the path in the optical network; determining, with the traverser software module, an order of traversal of the one or more node sets in the network link defining the path in the optical network; traversing the network link, including the first node and the one or more second node, using the determined order of traversal; communicating, by the traverser software module, information with a feature manager software module for a first software feature, the first software feature configured to perform a function specific to a specific node; and triggering, by the feature manager software module, the first software feature to execute one or more computer executable instruction based on information from the traverser software module.

In some embodiments, the feature manager software module may be a first feature manager software module, and the method may further comprise the steps of: registering, with the traverser software module, the first feature manager software module and a second feature manager software module for a second software feature, the second software feature configured to perform a function specific to a specific node, the function different than the function of the first software feature; and communicating, by the traverser software module, information with the second feature manager software module.

In some embodiments, the method may further comprise the step of maintaining, by the traverser software module, information regarding a set of nodes previously traversed such that a particular termination point is only traversed once for a particular traversal.

In some embodiments, the feature manager software module may be a first feature manager software module, and the method may further comprise the steps of: communicating, by the traverser software module with a second feature manager software module for a second software feature, the second software feature configured to perform a function specific to a specific node, the function different from the function of the first software feature; and instigating, by the second feature manager software module, the second software feature to execute one or more computer executable instruction based on information from the traverser software module.

In some embodiments, the traverser software module may be executed by a control module in the first node and/or may be executed by a computer processor external to the first node.

In some embodiments, the feature manager software module may be executed by a control module in the first node and/or may be executed by a computer processor external to the first node.

In one exemplary embodiment, a link traversal system may comprise a first network hardware device, in a network link defining a path in an optical network, comprising a control module and one or more first termination point, the control module configured to execute a traverser software module and a first feature manager software module for a first software feature, the first software feature configured to perform a function specific to a specific termination point and/or a specific network device, wherein the traverser software module is configured to: receive, from the first termination point of the first network hardware device, one or more node sets indicative of one or more of a second termination point and a second network hardware device also in the network link defining the path in the optical network; determine an order of traversal of the first and the second termination points in the network link defining the path in the optical network based at least in part on the one or more node sets; traverse the network link, including at least the first termination point and the one or more second termination point in the network link defining the path in the optical network, using the determined order of traversal; communicate information to the first feature manager software module; and wherein the first feature manager software module is configured to trigger the first software feature module to execute one or more computer executable instruction based on information communicated from the traverser software module.

In some embodiments, the traverser software module configured to communicate with the first feature manager software module may further comprise the traverser software module being configured to transmit one or more messages from the traverser software module on the first network hardware device to a second traverser software module on a second network hardware device. The traverser software module may be further configured to receive one or more messages from a second traverser software module on a second network hardware device. The traverser software module may be further configured to transmit the one or more messages to the feature manager software module.

In some embodiments, the termination point may comprises one or more feature manager software module, and the traverser software module may be further configured to transmit one or more functions to the one or more feature manager software module of the termination point.

In some exemplary embodiments, a link traversal system may comprise one or more computer processor running a traverser software module and a first feature manager software module that when executed cause the one or more computer processor to: receive, with the traverser software module, from a first node in a network link defining a path in an optical network, one or more node sets indicative of one or more of a second node also in the network link defining the path in the optical network; determine, with the traverser software module, an order of traversal of the first and the second nodes in the network link defining the path in the optical network based at least in part on the one or more node sets; traverse, with the traverser software module, the network link using the determined order of traversal; communicate, with the traverser software module, with the first feature manager software module; and trigger, with the first feature manager software module, the first software feature to execute one or more computer executable instruction based on information from the traverser software module in the first node and in the second node.

Definitions

If used throughout the description and the drawings, the following short terms have the following meanings unless otherwise stated:

API stands for Application Programing Interface. An API enables standardized interfaces and/or communications between software systems and/or components. In Object Oriented Programming, an API may be further defined as a set of methods and properties that an object uses to interact with other objects.

The term "node" represents an abstract interface in the system. The implementation of specific features may require network devices and/or termination points to implement this interface.

TE stands for Traffic Engineering which is a technology that is concerned with performance optimization of operational networks. In general, TE includes a set of applications mechanisms, tools, and scientific principles that allow for measuring, modeling, characterizing and control of data traffic in order to achieve specific performance objectives.

The terms "upstream" and "downstream" as used herein may be from the perspective of a particular intermediate node, such as a particular termination point and/or network device. In such a case, other nodes towards the head end (and/or the active side of the network) from the particular node may be considered "upstream" from the particular node. Likewise, other nodes towards the tail end (and/or the passive side of the network) from the particular node may be considered "downstream" from the particular node.

Description

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or"

refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

Further, the phrase "based on" is intended to mean "based, at least in part, on" unless explicitly stated otherwise.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Also, certain portions of the implementations have been described as "components" or "circuitry" that perform one or more functions. The term "component" or "circuitry" may include hardware, such as a processor, an application specific integrated circuit (ASIC), or a field programmable gate array (FPGA), or a combination of hardware and software. Software includes one or more computer executable instructions that when executed by one or more component or circuitry cause the component or circuitry to perform a specified function. It should be understood that the algorithms described herein are stored on one or more non-transient memory. Exemplary non-transient memory includes random access memory, read only memory, flash memory or the like. Such non-transient memory can be electrically based or optically based. Further, the transmissions described herein may be generated by the components and result in various physical transformations.

Circuitry could be analog and/or digital, components, or one or more suitably programmed microprocessors and associated hardware and software, or hardwired logic. It should be understood that the network devices can be implemented in a variety of manners including those shown and discussed in U.S. Patent Application No. 20090245289 entitled "Programmable Time Division Multiplexed Switching", the entire content of which is hereby incorporated herein by reference.

Information can be stored in a distributed fashion (distributed storage having multiple memory/storage devices) and processed in a distributed manner. Additionally and/or alternatively, the distributed storage may be replaced by a centralized memory that stores the information for all, or a subset, of the network devices. In this situation, the network devices may include communication paths to obtain the connection information from the centralized memory.

As discussed above, prior systems required feature-specific implementation, modification and verification of the existing software feature modules. In addition, as the software feature modules were changed to add more and more network link specific code, readability and maintainability of the software feature business logic degraded. As a consequence, a new software feature could not reuse the software modules of any of the existing software features even if the software features operated on the same network, resulting in long lead-times for implementation of software features and difficulty in de-bugging implementations. The present disclosure addresses these and other deficiencies with systems and methodologies for feature-agnostic decoupled optical network link traversal for link-agnostic retrieval, propagation, and/or injection of information in heterogeneous networks.

Figure 2:
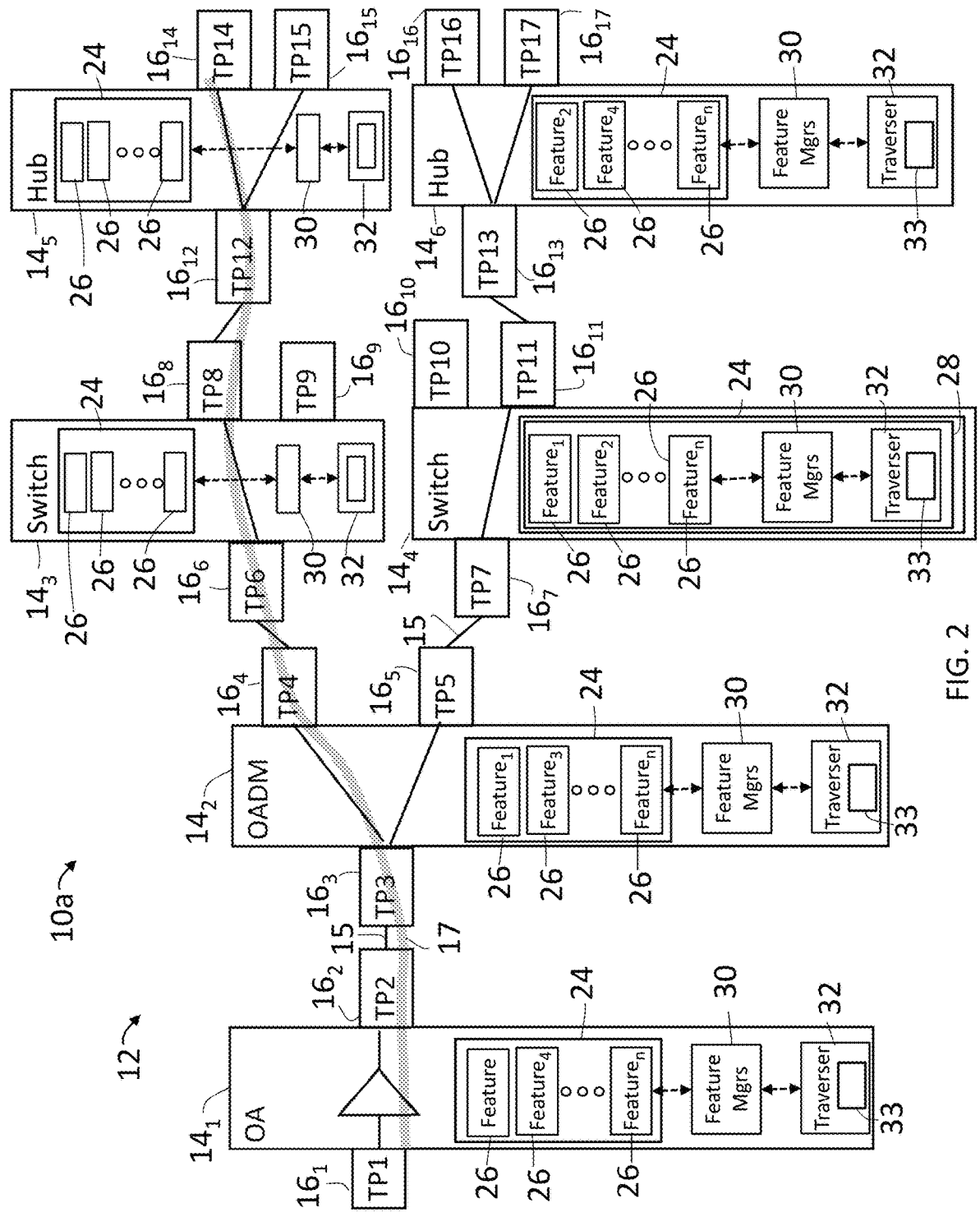
FIG. 2 is a schematic of another exemplary embodiment of a system in accordance with the present disclosure.

Referring now to the drawings, and in particular to FIGS. 1-5, an exemplary decoupled optical network link traversal system 10 (also referred to herein as the link traversal system 10) will be described. Generally, the link traversal system 10 acts in conjunction with one or more optical network 12. The optical network 12 may be used for the transmission of optical signals transmitting consumer and/or system data. The optical network 12 may comprise two or more optical network devices 14 connected by one or more optical fibers 15. The optical network devices 14 may be optical network hardware devices or combined network hardware and software devices. For exemplary purposes, the optical network 12 in FIGS. 1 and 2 is shown having exemplary optical network devices 14 that include an Optical Amplifier (OA) optical network device $14_1$, an Optical Add/Drop Multiplexer optical network device $14_2$, a first and a second switch optical network devices $14_3$ and $14_4$, and a first and a second hub optical network devices $14_5$ and $14_6$; and having termination points $16_1$ to $16_{17}$. However, it will be understood that the optical network 12 may have other quantities of and/or other types of optical network device 14 and termination points $16_n$.

Figure 3:
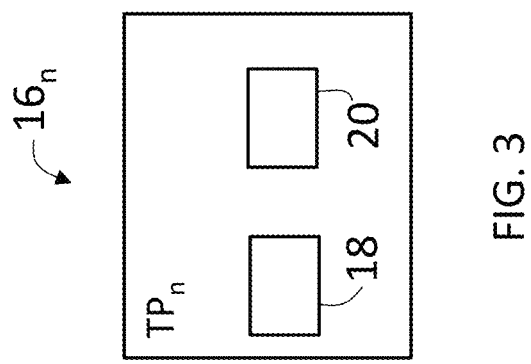
FIG. 3 is a schematic of an exemplary termination point of an exemplary embodiment of one or more system in accordance with the present disclosure.

Each optical network device 14 may have one or more termination point ("$TP_n$") $16_n$ acting as an input and/or an output to the optical network device 14, such that the optical network 12 may have termination points $16_1, 16_2, \ldots 16_n$. As shown in FIG. 3, the termination points $16_n$ may comprise circuitry 18 capable of carrying out executable instructions and/or functions. The termination points $16_n$ may comprise one or more software interface 20, through which the termination points $16_n$ may communicate, transfer signals indicative of information, and/or be controlled.

A path in and/or through the optical network 12 between a first network device 14 and a second network device 14 may be referred to as a network link 17. The network link 17 may include one or more additional network devices 14 and/or termination points $16_n$ between the first network device 14 and the second network device 14, such as shown in the examples of FIGS. 1 and 2.

The optical network device 14 may have one or more control module 24. The one or more control module 24 may be configured to execute one or more software feature 26 for the optical network device 14. The control module 24 may have one or more non-transitory memory 28 in which the one or more software feature 26 may be stored. Additionally or alternately, one or more of the software features 26 may be stored externally from the optical network device 14, such as on external non-transitory memory, but executed by the optical network device 14.

The one or more software features 26 control the functions of the optical network device 14 and/or the termination point $16_n$ in conjunction with the optical network 12. For example, software features 26 may control one or more of defect propagation, alarms, identifications, notifications, and other functions used in the operation of the optical network 12 and the optical network devices 14. Non-exclusive examples of software features 26 include Optical Line Defect Propagation, Inter-Object Alarm Correlation, OSC identification propagation for Traffic Engineered links, OTDR Spool Length Calculation, Software Controlled Optical Protection, and many more.

The link traversal system 10 may comprise one or more feature manager 30 and one or more traverser 32. The feature manager 30 may be referred to as the feature manager software module. The traverser 32 may be referred to as the link traverser and/or the traverser software module. The feature manager(s) 30 and the traverser(s) may use the interface 20 of the termination points $16_n$ to manipulate the termination points $16_n$. The feature manager(s) 30 and the traverser 32 that manages a particular termination point $16_n$ may be modeled in terms of a concrete class that implements a generic interface in an objected-oriented software framework.

Figure 4:
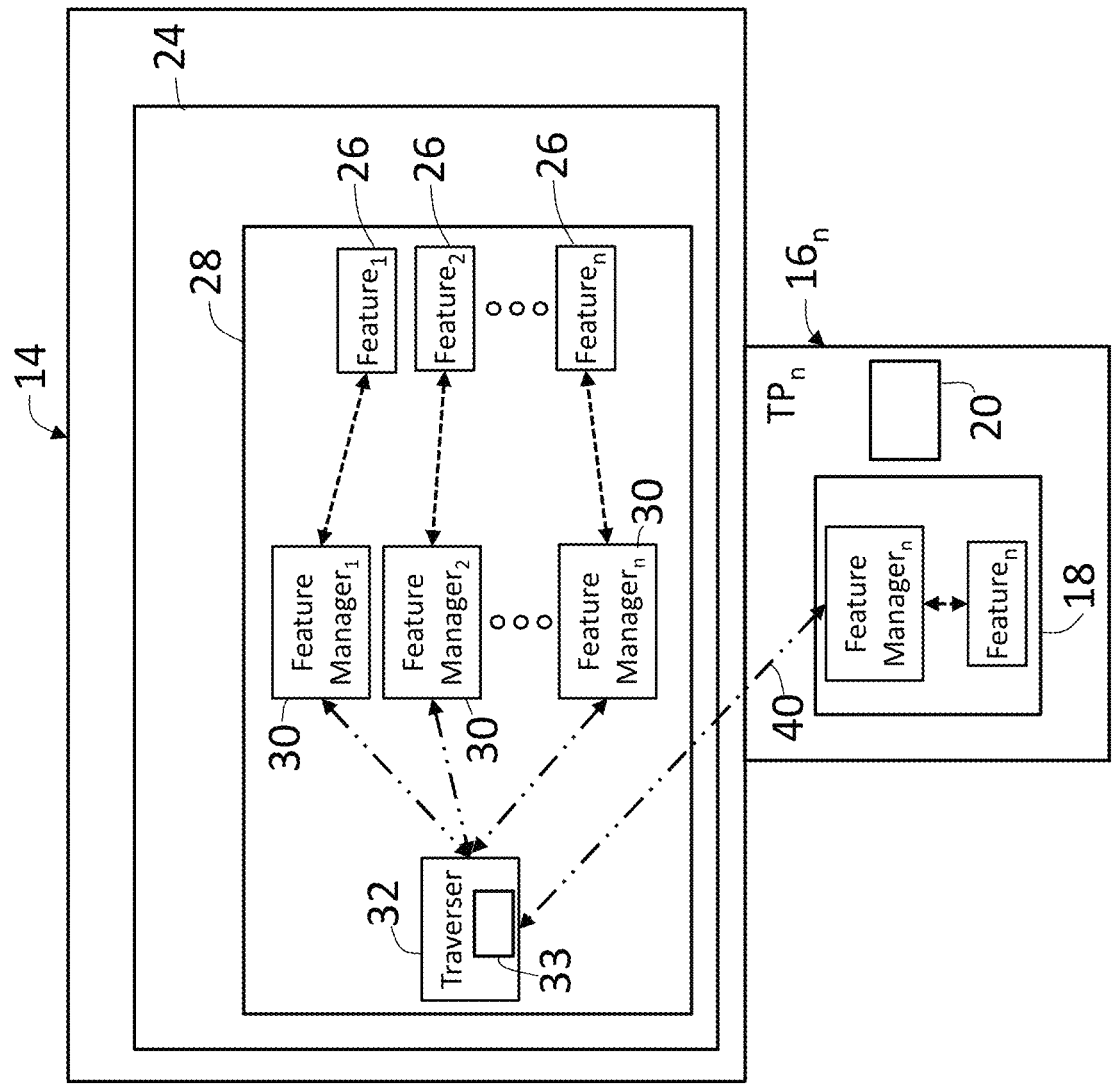
FIG. 4 is a schematic of an exemplary network device of the exemplary system of FIG. 2.
Figure 5:
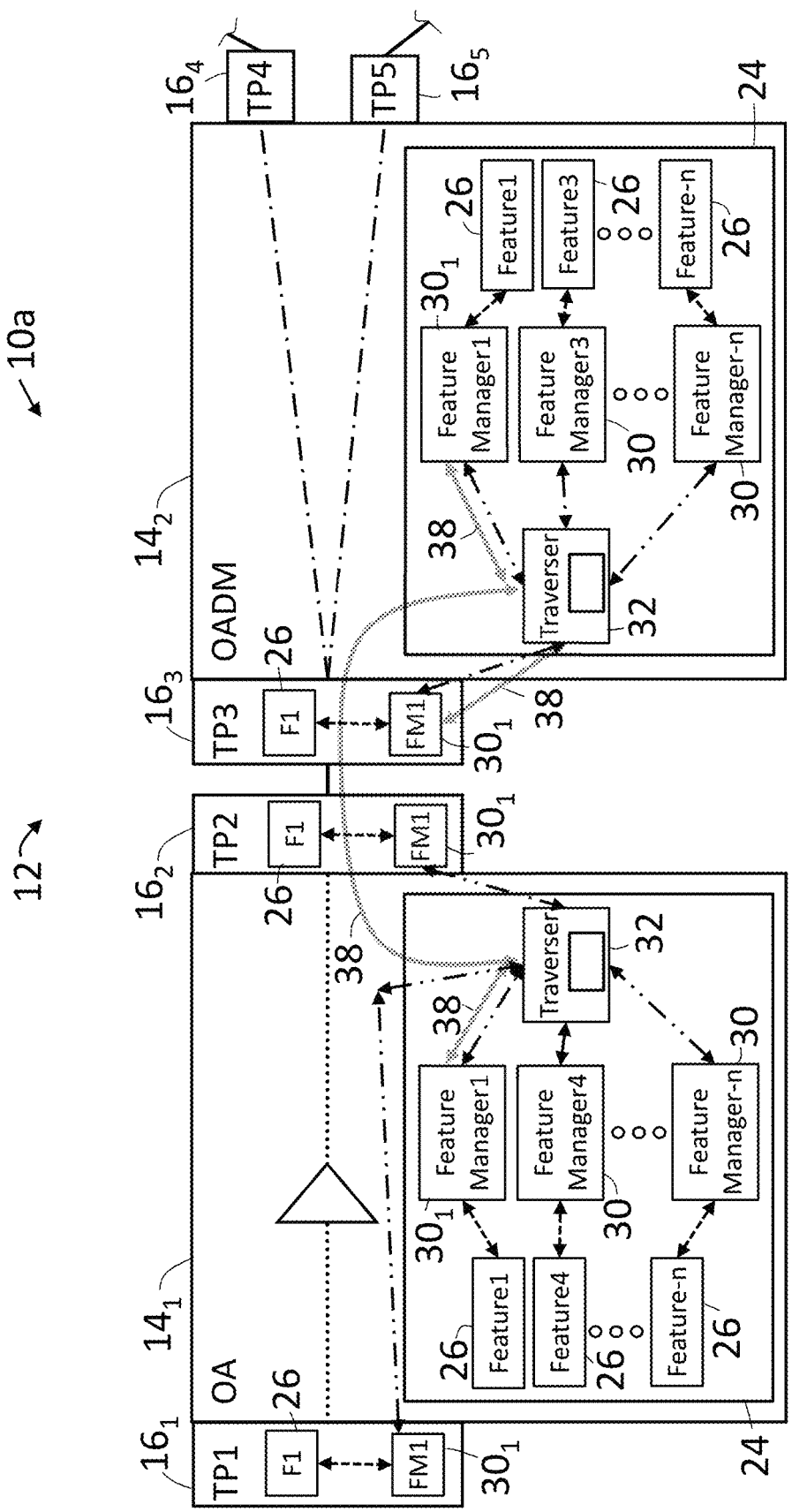
FIG. 5 is a schematic of a portion of the exemplary system of FIG. 2.

The feature manager 30 may be comprised of software that is executable on circuitry, such as one or more processor 34, outside of the network devices 14, as shown in FIG. 1. Additionally or alternatively, the feature manager 30 may be comprised of software that is executable on circuitry within one or more of the network devices 14, as shown in FIGS. 2, 4, and 5. In one embodiment, the feature manager 30 may be executable by the control module 24 in one or more of the network devices 14. The feature manager 30 may be stored in one or more non-transitory memory, such as the non-transitory memory 28 and/or external non-transitory memory.

A particular feature manager 30 may be configured to interface with a particular software feature 26 in one or more of the termination points $16_n$ and/or the network devices 14. For example, a first feature manager 30 may be configured to interface with a first software feature 26 in termination point (TP2) $16_2$, the first software feature in the OA network device $14_1$, the first software feature in the OADM network device $14_2$, and with the first software feature 26 in termination point (TP3) $16_3$, as illustrated in FIG. 1. Additionally a second feature manager 30 may be configured to interface with a second software feature 26 in termination point (TP13) $16_{13}$, with the second software feature 26 in the second switch network device 14, and with the second software feature 26 in the second hub network device 14, and so on.

One example of the interface between the feature manager 30 and the software feature 26 is through inheritance in object oriented programming. Inheritance is a mechanism that bases an object or class upon another object, such that the new object or class has the properties and behaviors of the original object. For example, the control modules 24 and or one or more external processor 34 may implement a "FeatureManager" software interface. Concrete implementations of the "FeatureManager" software interface may be used to implement an abstract "ProcessNodeData" application programming interface (API) to process data of an individual termination point $16_n$.

In one embodiment, the feature manager 30 may obtain and/or receive information indicative of which software features 26 are associated with particular network devices 14 and/or termination points $16_n$.

The traverser(s) 32 may be comprised of software that is executable on circuitry, such as one or more processor 36, outside of the network devices 14, as shown in FIG. 1. Multiple traversers 32 may be executed by circuitry, such as one or more processor 36, outside of the network devices 14. Additionally or alternatively, the traverser(s) 32 may be comprised of software that is executable on circuitry within one or more of the network devices 14, as shown in FIGS. 2, 4, and 5. In one embodiment, the traverser(s) 32 may be executable by the control module 24 in one or more of the network devices 14. The traverser(s) 32 may be stored in one or more non-transitory memory, such as the non-transitory memory 28 and/or external non-transitory memory. The traverser(s) 32 may further comprise one or more non-transitory memory 33.

The traverser 32 may be configured to interface with the feature manager 30, such as through an application programming interface (API).

In embodiments in which the feature manager 30 and the traverser 32 may be comprised of software that is executable on circuitry such as the control module 24 within one or more of the network devices 14, each network device $14_n$ in a set of network devices $14_n$ may store the feature manager(s) $30_n$ and the traverser(s) $32_n$, as illustrated in FIG. 5. In such a case, a first feature manager $30_1$ executed in a first network device $14_1$ may communicate with a second feature manager $30_1$ executed in a second network device $14_2$, such as through messages 38. A first traverser 32 running in the first network device $14_1$ may determine that the second network device $14_2$ is the next to be traversed and may deliver the message(s) 38 from the first feature manager $30_1$ of the first network device $14_1$ to a second traverser 32 in the second network device $14_2$. The second traverser 32 of the second network device $14_2$ may then transmit the message(s) 38 to the second feature manager $30_1$ of the second network device $14_2$. The information communicated in the messages may be specific to the particular software feature 26. For example, for a software feature 26 with an "Alarm Suppression" function, the information could be a set of faults present in an upstream termination point. However, the messages 38 are opaque to the traverser 32 and do not affect the functionality of the traverser 32.

When the traverser $32_n$ visits network devices $14_n$ or termination points $16_n$ (that is, nodes) that are not accessible from the same circuitry or processor (such as not accessible by the control module 24) that executes the traverser $32_n$, (that is, outside the boundary of the current processor or circuitry, such as other network devices $14_n$ or termination points $16_n$ of other network devices), the traversers $32_n$ and the feature managers $30_n$ may communicate through the message(s) 38 transmitted between the traversers $32_n$ and the feature managers $30_n$.

When the traverser $32_n$ visits network devices $14_n$ or termination points $16_n$ (that is, nodes) that are accessible from the same circuitry or processor (such as from the control module 24) that executes the traverser $32_n$, the traverser $32_n$ may invoke an API (such as "ProcessNodeData") of the registered feature managers $30_n$ of those network devices $14_n$ or termination points $16_n$. For example, the feature managers $30_n$ of a particular network element and the termination points $16_n$ belonging to the particular network device $14_n$ are accessible from the control module 24 of the particular network device $14_n$. In the example illustrated in FIG. 5, termination points (TP1) $16_1$ and (TP2) $16_2$ of the OA network device $14_1$ are accessible from the control module 24 of the OA network device $14_1$, while termination points (TP3) $16_3$, (TP4) $16_4$, and (TP5) $16_5$ of the OADM network device $14_2$ are not accessible from the control module 24 of the OA network device $14_1$.

In one embodiment, the link traversal system 10, 10a further comprises a "Node" software interface that may be implemented by the circuitry 18 of the individual termination points $16_n$ and/or the network devices 14. Concrete implementation of the "Node" software interface may then implement abstract application programming interfaces (APIs) "GetDownStreamNodeSet" and "GetUpstreamNodeSet" to determine the sets of upstream and/or downstream termination points $16_n$ and/or network devices 14 (node sets) for the particular termination point $16_n$, and provide information indicative of the sets of upstream and/or downstream termination points $16_n$ and/or network devices 14 (the node sets) for the particular termination point $16_n$ to the link traverser 32.

The traverser 32 may comprise a "LinkTraverser" abstract base class to encapsulate the network link traversal mechanism. For example, the "LinkTraverser" abstract base class may implement an algorithm "TraverseLink" to traverse a network link 17 between two or more nodes (such as termination points $16_n$ and/or network device 14). The traverser 32 may also provide an application programming interface (API) "RegisterFeatureManager" to register the one or more feature manager 30. During link traversal, each registered feature manager 30 may have the "ProcessNodeData" API called back for each termination point $16_n$ and/or network device 14 (node) traversed.

Concrete implementations of the "LinkTraverser" abstract base class may be used to implement an abstract application programming interface (API), for example, "GetNextNodesInLink", to extract the next set of termination points $16_n$ (nodes) from the current termination point $16_n$ (node) being processed. There may be concrete implementations of "LinkTraverser" abstract base class, such as "UpStreamLinkTraverser" and "DownStreamLinkTraverser" which may implement the "GetNextNodesInLink" API by calling the "GetUpstreamNodeSet" and "GetDownstreamNodeSet" APIs of the termination point $16_n$ (node), respectively.

However, the concrete "LinkTraverser" abstract base class variants need not be limited to upstream and downstream traversal only. The framework allows applications to define custom link traversal mechanisms by deriving from the "LinkTraverser" base class and overriding the "GetNextNodesInLink" API. In addition, applications can store certain meta-information in the non-transitory memory 33 of the traverser 32 for specific traversal requirements. For example, when multiple network links 17 share a segment of the optical network 12, the path identifier can be stored in the meta-information to traverse a specific network link 17 differentiated from the other network links 17 in the shared segment. The traverser 32 may pass this meta-information to the termination points $16_n$ while acquiring the next set of termination points $16_n$ to visit.

The "FeatureManager" software interfaces employing this framework may typically use a strict weak ordering of the termination points $16_n$ and/or network devices 14 (nodes) during link traversal. That is, if a node has already been visited during traversal, it should not be visited again. However, there may be exceptions to this norm and one or more applications may require revisiting nodes during traversal. However, it is useful to prevent an already visited node to be visited again unless the "FeatureManager" software interfaces require it. Thus, the framework may use a strict weak ordering during link traversal as the initial default. To achieve this, the "LinkTraverser" abstract base class may maintain information regarding the set of nodes that have already been visited. If a node is found to be present in the set of already visited nodes during traversal, it is not visited again. The software features 26 may request the "LinkTraverser" abstract base class to disable strict weak ordering through the "SetStrictWeakOrdering" API provided by the link traverser 32.

Figure 6:
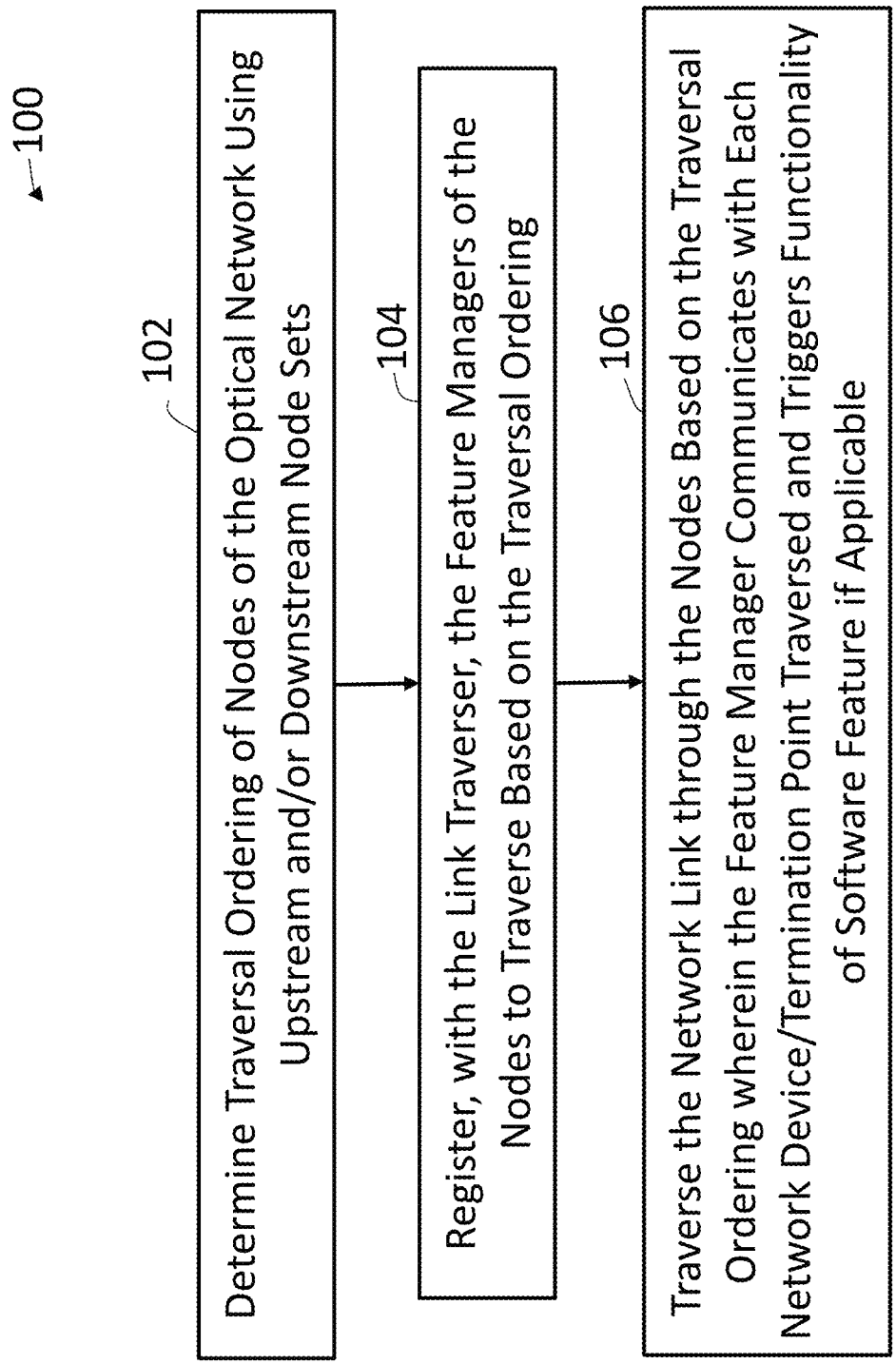
FIG. 6 is a flow chart of an exemplary method in accordance with the present disclosure.

FIG. 6 illustrates an exemplary decoupled optical network link traversal method 100 (also referred to as the link traversal method 100). The link traversal method 100 may utilize a software object oriented framework to enforce decoupling of the network link traversal mechanism from the business logic of the software features 26 that operate on the optical network 12 using the link traversal system 10. For purposes of this description, the term "software object oriented framework" may be interpreted to mean a software framework implemented in terms of objects and their interactions. The particular object oriented framework described herein may be used with one or more of the software features 26 so as to create a link traversal mechanism for the optical network 12 that can be utilized by one or more of the software features 26 for information retrieval, propagation, injection, and/or other functions, irrespective of the dissimilarities in the business logic of the software features 26 or the kind of information of the optical network 12 or of the nodes processed by the software feature 26. It will be understood that while the exemplary methods and systems are described using object oriented programming and framework, the methods and systems may be carried out using other types of programming and frameworks.

In step 102, the link traversal method 100 may determine a traversal ordering of nodes of the optical network 12 using upstream and/or downstream node sets. In step 104, the traverser 32 may register the feature managers 30 associated with the nodes to be traversed for a particular network link 17, based on the determined traversal ordering. In step 106, the link traversal method 100 may traverse the nodes (such as the network devices 14 and termination points $16_n$) based on the determined traversal ordering. The feature manager(s) 30 may communicate with the network devices 14 and the termination points $16_n$ to determine if the network devices 14 and the termination points $16_n$ contain software features 26 that should be activated, based on the purpose of the traversal. If the software features 26 should be activated, the software features 26 carry out the software instructions particular to the individual software feature 26.

Figure 7:
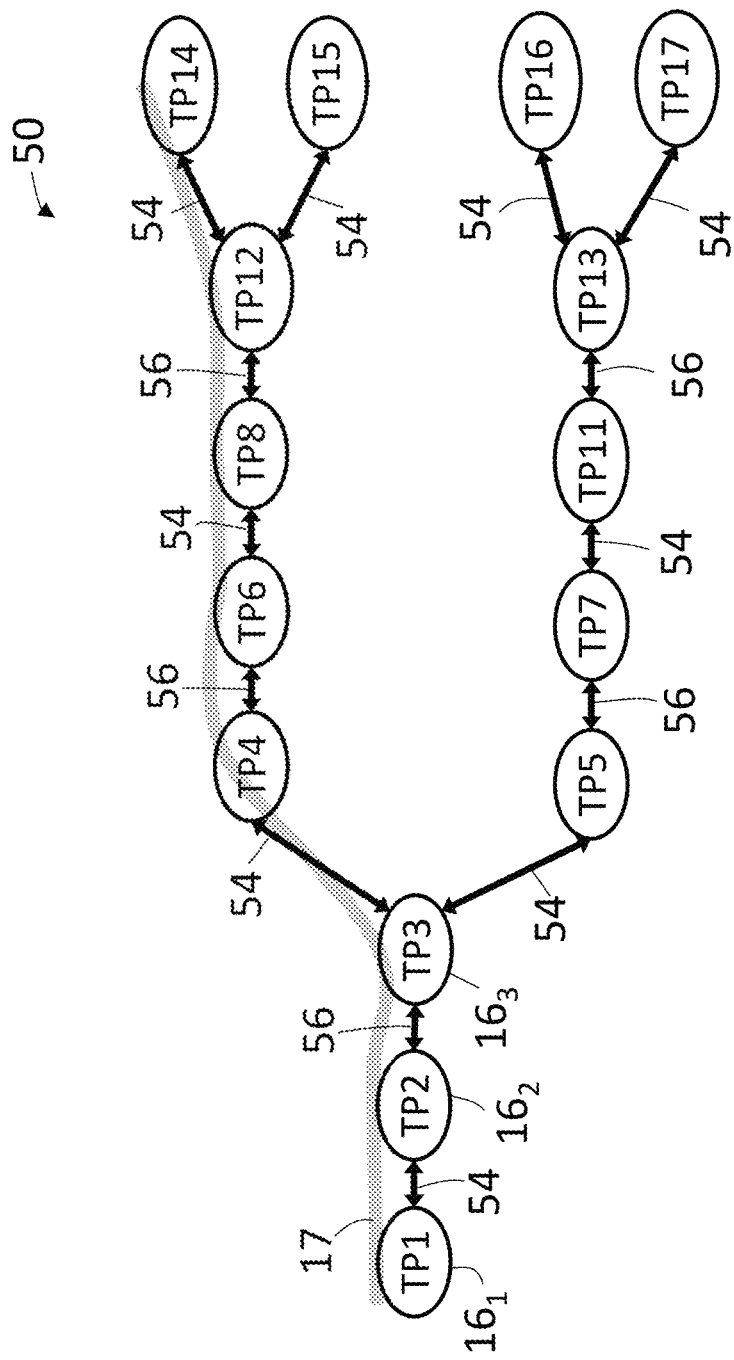
FIG. 7 is an exemplary directed graph in accordance with the present disclosure.

In one embodiment, the network link(s) 17 traversed by the traverser 32 can be visualized as a directed graph 50 representative of the optical network 12. The constituent termination points $16_n$ of the optical network 12 may be represented as the nodes of the directed graph 50, whereas the interconnections among the termination points $16_n$ may connote the edges in the directed graph 50. For example, FIG. 7 illustrates an exemplary directed graph 50 based on the exemplary optical network 12 of FIGS. 1 and 2.

The link traversal method 100 may determine a weak traversal ordering of the termination points $16_n$ and/or network devices 14 in the optical network 12, as represented by the nodes of the directed graph 50. Weak traversal ordering, as used herein and as understood by persons having ordinary skill in the art, may be understood as the ranking of the termination points $16_n$ and/or network devices 14 for the movement of data through the optical network 12, in which tied rankings of termination points $16_n$ and/or network devices 14 may be allowed.

For example, in the exemplary optical network 12, an input signal into termination point (TP3) $16_3$ of the OADM network device 14 may be de-multiplexed into outputs to termination points (TP4) $16_4$ and (TP5) $16_5$. In weak traversal ordering, a downstream traversal may be performed of termination point (TP3) $16_3$, termination point (TP4) $16_4$, and termination point (TP5) $16_5$ either in an order of TP3 to TP4 to TP5, or in an order of TP3 to TP5 to TP4. However, TP3 cannot be traversed after TP4 or TP5. Therefore, an order of TP4 to TP3 to TP5 is an incorrect ordering, as is an order of TP5 to TP3 to TP4. In mathematical terms TP3>TP4 and TP3>TP5; but TP4 and TP5 are taken as equals and may be placed in any order in relation to one another. In contrast, in a "strong" traversal ordering, elements cannot be equal. As such, for strong traversal ordering as applied in this example, the order of TP3 to TP4 to TP5, and the order of TP3 to TP5 to TP4, cannot both be valid orderings.

The weak traversal ordering of the termination points $16_n$ may be determined by one or more factors, such as the type of termination points $16_n$, the interconnections between termination points $16_n$, the direction of traversal, and so on. The link traversal method 100 may be utilized further to specify the set of originating termination points $16_n$, terminating termination points $16_n$, and, given a termination point $16_n$, a set of termination points $16_n$ to traverse next in a particular direction chosen through the optical network 12.

In the directed graph 50, the termination point $16_n$ represented by the nodes of the graph 50 may act as an ingress or egress point of a particular stage of processing, such as processing carried out by one or more of the software features 26 in the one or more optical network device 14. In the directed graph 50, process edges 54 from ingress termination points to egress termination points of the network devices 14 may represent one or more processing function of one or more software feature 26 and/or the control module 24 within the optical network devices 14. The order of the traversal of the network link 17 may be guided by what functions the one or more software feature 26 and/or the control module 24 within the optical network devices 14 are configured to execute. For example, in the example of traversing the ingress termination point (TP6) 166 of the first optical switch network device 14, the next node for a downstream traversal would be the egress termination point (TP8) 168 of the first optical switch network device 14 to which the input signal for the ingress termination point (TP6) 166 is cross-connected.

Transfer edges 56 in the directed graph 50 are those that connect the egress termination points $16_n$ of a first network device 14 to the ingress termination points $16_n$ of a second network device 14. The transfer edges 56 may represent handing over of opaque information of feature interest between network devices 14 and/or between software features 26. Information of feature interest may include information needed by one or more of the software features 26 for the software feature 26 to carry out the function of the software feature 26. The one or more feature managers 30 may gather and/or store feature-specific information from one or more of the termination points $16_n$ and inject the feature-specific information to one or more of the termination points $16_n$. However, the feature-specific information gathered from and/or injected to the termination points $16_n$ is opaque to the traverser 32.

The determined topology of the optical network 12, such as represented by the directed graph 50, may be used in determining the weak traversal ordering of the termination points $16_n$. The weak traversal ordering may be determined based at least in part by determining the upstream node sets and/or downstream node sets for each termination point $16_n$.

Each termination point $16_n$ in the optical network 12 (that is, the nodes in the directed graph 50) may be defined to have a set of zero or more upstream termination points $16_n$ (that is, an upstream node set, "$S_{up}$") and a set of zero or more downstream termination points $16_n$ (that is, a downstream node set, "$S_{down}$"). What constitutes the sets of upstream and/or downstream termination points $16_n$ of a particular termination point $16_n$ depends on the nature of the termination point $16_n$ and the heterogeneous nature of interconnections of the termination points $16_n$. Interconnections of the termination points $16_n$ are not limited to physical optical fiber links 15, but also may extend to internal links within the network devices 14, adding to the heterogeneity of the links to be traversed. The terms "upstream" and "downstream" as used herein may be from the perspective of a particular intermediate termination point $16_n$. In such a case, other termination points $16_n$ towards the head end (and/or the active side of the network) from the particular termination point $16_n$ may be considered "upstream" from the particular termination point $16_n$. Likewise, other the termination points $16_n$ towards the tail end (and/or the passive side of the network) from the particular termination point $16_n$ may be considered "downstream" from the particular termination point $16_n$.

The following example of the determination of the weak traversal ordering using determination of upstream node sets and downstream node sets are with respect to the exemplary optical network 12 illustrated in FIGS. 1 and 2 and in the directed graph 50 of FIG. 7 for the exemplary network link 17. In general, the egress termination points $16_n$ of the previous processing stage form the upstream node set (Sup) of the ingress termination points $16_n$ of the next processing stage which, on the other hand, form the downstream node set (Sdown) of the previous egress termination point $16_n$.

In the exemplary optical network 12 depicted in FIGS. 1, 2 and 7, the optical input from the ingress termination point (TP1) $16_1$ to the optical amplifier (OA) network device 14 is amplified by the optical amplifier (OA) network device 14, and transmitted through the egress termination point (TP2) $16_2$ of the OA network device 14 to the ingress termination point (TP3) $16_3$ of the OADM network device 14. In this example, the upstream node set (Sup) for the egress termination point (TP2) $16_2$ of the OA network device 14 is made up of the ingress termination point (TP1) $16_1$ of the OA network device 14. The downstream node set (Sdown) for the ingress termination point (TP1) $16_1$ of the OA network device 14 is made up the egress termination point (TP2) $16_2$ of the OA network device 14. As such, the downstream node set (Sdown) for the termination point (TP1) $16_1$ and the upstream node set (Sup) for the termination point (TP2) $16_2$ may be described as the following:

$$S_{down}(TP1)=\{TP2\}$$

$$S_{up}(TP2)=\{TP1\}$$

The downstream node set (Sdown) in relation to the termination point (TP2) $16_2$ and upstream node set (Sup) in relation to the termination point (TP3) $16_3$ in the exemplary directed graph 50 may be described as the following:

$$S_{down}(TP2)=\{TP3\}$$

$$S_{up}(TP3)=\{TP2\}$$

In this example, the Optical Add/Drop Multiplexer (OADM) network device 14 may de-multiplex optical input signals from the ingress termination point (TP3) $16_3$ and may transfer the de-multiplexed optical signals through egress termination points (TP4) $16_4$ and (TP5) $16_5$ of the OADM network device 14 to the ingress termination points (TP6) 166 and (TP7) 167 of the switch network devices 14. Therefore, the upstream node sets and/or downstream node sets for the termination points (TP3) $16_3$, (TP4) $16_4$, (TP5) $16_5$, (TP6) 166, and (TP7) 167 may be described as the following:

$$S_{down}(TP3)=\{TP4,TP5\}$$

$$S_{up}(TP4)=\{TP3\}$$

$$S_{up}(TP5)=\{TP3\}$$

$S_{down}(TP4)=\{TP6\}$ $S_{up}(TP6)=\{TP4\}$ $S_{down}(TP5)=\{TP7\}$ $S_{up}(TP7)=\{TP5\}$ In the exemplary optical network 12, a first Optical Switch network device 14 may switch the input optical signal from its ingress termination point (TP6) $16_6$ to one of its egress termination points (TP8) $16_8$ and may transfer the optical signal to the ingress termination point (T12) $16_{12}$ of a first hub network device 14. The upstream node sets and/or downstream node sets for the termination points (TP6) $16_6$, (TP8) $16_8$, and (TP12) $16_{12}$ may be described as the following:

$S_{down}(TP6)=\{TP8\}$ $S_{up}(TP8)=\{TP6\}$ $S_{down}(TP8) = \{TP12\}$ $S_{up}(TP12) = \{TP8\}$ As determination of the upstream and downstream node sets are specific to a particular termination point $16_n$, the responsibility of populating the upstream and downstream node sets may be delegated to the termination point $16_n$ itself. The termination points $16_n$ may be modeled as specific classes in an object oriented software framework that implement a generic interface. For example, the traverser may call a function from a generic API of the termination point $16_n$, such as "GetUpstreamNodeSet" or "GetDownstremNodeSet". The specific actual implementation of the API may vary based on the type of the termination point $16_n$. For example, the implementation of "GetDownstremNodeSet" by an ingress termination point $16_n$ of the OADM network device 14 would return a set of all egress termination points (TP4) $16_4$ and (TP5) $16_5$ of the OADM network device 14. On the other hand, the "GetDownstreamNodeSet" implemented by the ingress termination point $16_6$ of the optical switch network device 14 would return only the egress termination point (TP8) $16_8$ to which the ingress termination point $16_6$ is cross-connected. In the instances in which the traverser 32 is implemented within the network device 14, the above logic may be executed by the control module 24.

The "Node" software interface may be implemented by the circuitry 18 of the individual termination points $16_n$. Concrete implementation of the "Node" software interface may implement abstract application programming interfaces (APIs) "GetDownStreamNodeSet" and "GetUpstreamNodeSet" to determine the upstream and downstream termination points $16_n$ (node sets) for the particular termination point $16_n$ and provide information indicative of the upstream and downstream termination points $16_n$ (that is, the node sets) for the particular termination point $16_n$ to the link traverser 32. The "ProcessNodeData" application programming interface (API) may process data of an individual termination point $16_n$.

In one embodiment, the "LinkTraverser" abstract base class may implement the "TraverseLink" to traverse a network link 17 between two or more termination points $16_n$. As part of step 104 of the link traversal method 100, the "LinkTraverser" abstract base class may provide the application programming interface (API) "RegisterFeatureManager" to register one or more FeatureManager. During link traversal, the registered feature managers 30 may have the "ProcessNodeData" API called back for each termination point $16_n$ (node) traversed.

Concrete implementations of the "LinkTraverser" may be used to implement the abstract application programming interface (API) "GetNextNodesInLink" to extract the next set of termination points $16_n$ from the current termination point $16_n$ being processed. The "UpStreamLinkTraverser" and "DownStreamLinkTraverser" may be used to implement the GetNextNodeslnLink API by calling the GetUpstreamNodeSet and GetDownstreamNodeSet APIs of the "Node" software interface, respectively.

One embodiment of the link traversal method 100 may utilize the following exemplary Link Traversal Algorithm:

Method TraverseLink (LinkTraverser self, Node startNode)
  Begin
    Set<Node>nodesToTraverse:=ϕ
    Set<Node>nodesAlreadyVisited:=ϕ
    nodesToTraverse:=nodesToTraverse∪{startNode}
    while (nodesToTraverse≠ϕ)
    do
      curNode:=nodesToTraverse.front
      for each featureManager∈self.Registered FeatureManagerSet
      do
        featureManager.ProcessNodeData(curNode)
        if (self.GetStrictWeakOrdering( )=true)
        then
          nodesAlreadyVisited:
            =nodesAlreadyVisited∪{curNode}
        endif
      done
      nodesToTraverse:=nodesToTraverse∪
        (self.GetNextNodeslnLink(curNode)−nodesAlreadyVisited)
      nodesToTraverse:=nodesToTraverse−{curNode}
    done
  End It will be understood that while the exemplary methods 100 and systems 10, 10a are described using object oriented programming and framework, the method and system may be carried out using other types of programming and frameworks.

Figure 8:
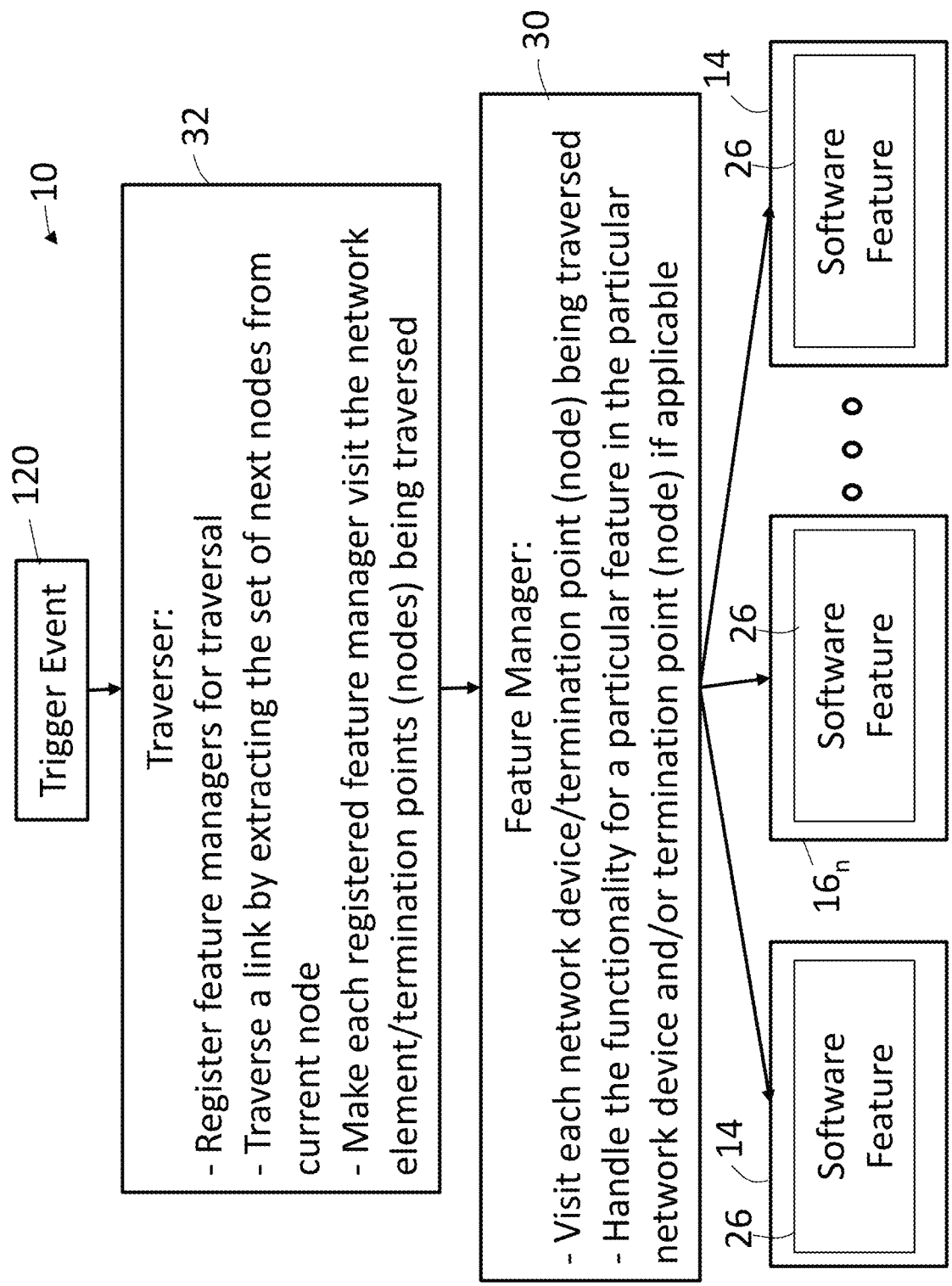
FIG. 8 is a flow chart of an exemplary method in accordance with the present disclosure.

FIG. 8 illustrates the exemplary link traversal system 10 in use in accordance with the present disclosure. In one embodiment, a trigger event 120 may occur that triggers the link traversal method 100 to be implemented for a particular network link 17 to be traversed through the optical network 12 by the traverser 32. Nonexclusive examples of the trigger event 120 include a change in the optical network 12, a change in one or more of the network devices 14, a creation of an association between network devices 14, a reboot, and a change in one or more of the software features 26 (including code changes and/or an addition of one or more new software features 26) of the network devices 14. It will be understood that other events in or external to the optical network 12 may act as the trigger event 120. The nature of the trigger event 120 may determine what type of traverser 32 is used (for example, upstream, downstream, and/or custom). The nature of the trigger event 120 may determine what feature managers 30 to register with the traverser 32.

Next, the one or more traversers 32 may register the one or more feature managers 30 to be traversed. To register the one or more feature managers 30, the one or more traversers 32 may create a list of, or otherwise organize information regarding, the specific feature managers 30 to be traversed. The traverser 32 may store the information regarding the registered feature managers 30.

The traverser 32 may traverse the network link 17 (that is, transition information through the network device(s) 14 and/or the termination point(s) 16$_n$ in the path of the network link 17) by extracting and/or receiving a set of next termination points 16$_n$ and/or network devices 14 (next nodes) from the current termination point 16$_n$ and/or network device 14 (current node). The traverser 32 may direct the registered feature managers 30 to communicate with the network device(s) 14 and/or termination point(s) 16$_n$ (depending on the specific requirements of the software feature 26) being traversed.

The feature managers 30 may communicate with the network device(s) 14 and/or termination point(s) 16$_n$ being traversed. The feature managers 30 may handle the functionality in the particular network device 14 and/or termination point(s) 16$_n$, if the functionality of the software feature 26 is applicable to the purpose of the traversal as related to the trigger event 120. The feature manager 30 may execute a specific task related to the software feature 26 (for example, OLDP or TE Link in FIG. 9) for a particular network device 14 and/or termination point 16$_n$ (either of which may be referred to herein as a "node") being visited. For example, the feature manager 30 may suppress an alarm, update an OSC ID, and/or inject/collect TE link information.

Figure 9:
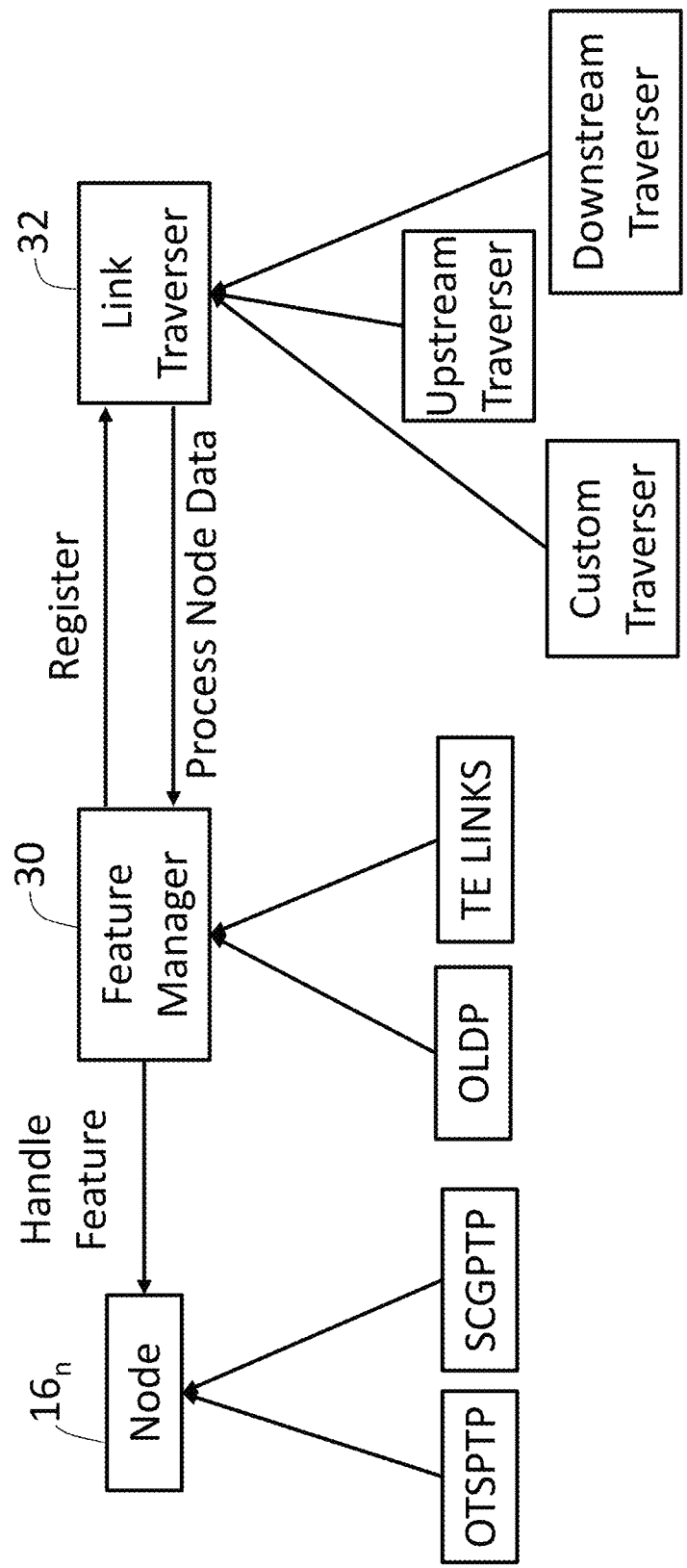
FIG. 9 is a schematic of an exemplary embodiment of a system in accordance with the present disclosure.

FIG. 9 illustrates another example of the link traversal system 10, 10*a* and the link traversal method 100 in use. The term "node" represents an abstract interface in the link traversal system 10, 10*a*. The implementation of specific features may require network devices 14 and/or termination points 16$_n$ to implement this interface The traverser 32 may be used to traverse the network link 17 in an upstream direction, in a downstream direction, and/or in a custom pattern (for example, when particular software features 26 are not present in certain network devices 14 and/or certain termination points 16$_n$). For a particular termination point 16$_n$ of a particular network device 14, the traverser 32 may register the feature manager 30 and process the termination point 16$_n$ to extract the upstream node set and/or downstream node set from the termination point 16$_n$. The traverser 32 may instruct the feature manager 30 to execute the software features 26 applicable to the trigger event 120 for the traversal of the network link 17. For example, the network device 14 and/or the termination point 16$_n$ may apply information from the traverser 32 to a particular software feature 26 if the particular software feature 26 is present and/or if the information is applicable to the particular software feature 26. FIG. 9 further illustrates non-exclusive exemplary types of termination points 16$_n$ for the optical network 12, such as a Super Channel Group Physical Termination Point (SCGPTP) and an Optical Transmission Section Physical Termination Point (OTSPTP).

Figure 10:
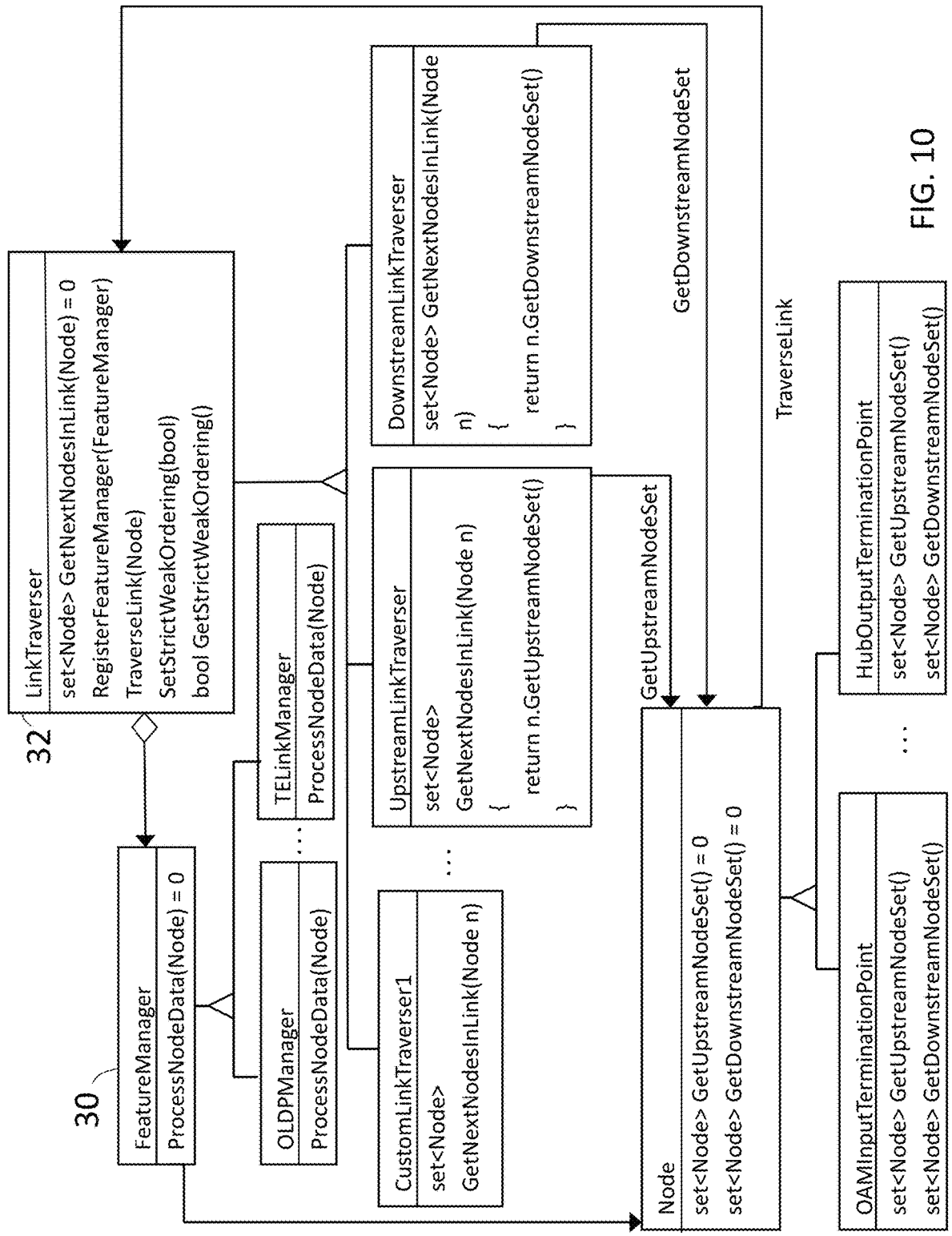
FIG. 10 is another schematic of an exemplary embodiment of a system in accordance with the present disclosure.

FIG. 10 illustrates a schematic of an object orientated class diagram of the example of the link traversal method 100 in FIG. 9, based on the exemplary optical network 12 of FIGS. 1 and 2.

Particular non-exclusive examples of the link traversal system 10, 10*a* and link traversal method 100 in use in accordance with the present disclosure will now be described.

In one example, the link traversal system 10, 10*a* and link traversal method 100 may be used in building a Traffic Engineering (TE) link information base for the optical network 12. Typically, a Traffic Engineering Link Manager is required to aggregate Traffic Engineering link information across the network link 17 in and/or through the optical network 12. The Traffic Engineering Link Manager may implement the link traversal method 100 to traverse the termination points 16$_n$ in the optical network 12 and build the information base by processing the data in the termination points 16$_n$ (nodes) traversed.

In one example, the link traversal system 10, 10*a* and link traversal method 100 may be used as part of optical line defect propagation in the optical network 12. An Optical Line Defect Propagation (OLDP) software feature is configured to detect conditions in the network link 17 in and/or through the optical network 12 and inject an alarm indication for the next network device 14 in the optical network 12 based on the detected conditions. Thus, each termination point 16$_n$ the network link 17 may be associated with a particular OLDP manager and the termination points 16$_n$ may send information about the detected conditions to the particular OLDP manager. The OLDP manager may implement the link traversal method 100 to traverse the network link 17 and associate the termination points 16$_n$ with the OLDP manager.

In one example, the link traversal system 10, 10*a* and link traversal method 100 may be used as part of alarm correlation in the optical network 12. A single failure in an optical network 12 is often detected as error conditions in multiple termination points 16$_n$. However, in order to stop alarms from flooding the optical network 12, the network devices 14 are required to report only a single alarm for a single failure in the optical network 12. An alarm correlation builder may implement the link traversal method 100 to traverse the network link 17 in the optical network 12 and suppress alarms in the downstream termination points 16$_n$ if an error condition is present in one of the upstream termination points 16$_n$.

In one example, the link traversal system 10, 10*a* and link traversal method 100 may be used as part of software controlled optical protection in the optical network 12. In some optical networks 12, a software controlled switch may be employed for protection of optical data. In such a system, the termination points 16$_n$ in each of the network paths being protected are associated with the software optical protection manager protecting the particular network path. This enables the termination points 16$_n$ to report error conditions detected to the optical protection manager. The optical protection manager may use this information to make traffic switching decisions. A particular optical protection manager may implement the link traversal method 100 to traverse the portion of the optical network 12 the particular optical protection manager protects, and associate the termination points 16$_n$ in the portion of the optical network 12 with the particular optical protection manager.

In one example, the link traversal system 10, 10*a* and link traversal method 100 may be used as part of precise fiber cut diagnosis for multi-degree networks. An Optical Time Domain Reflector (OTDR) with an internal switch may be deployed in a multi-degree network with different degrees involving different numbers and types of Field Replaceable Units (FRUs) having various internal spools of unalike fiber types. Based on the degree chosen by the switch of the OTDM, internal spools and fiber type of FRUs may be aggregated utilizing the link traversal method 100 for precise fiber cut diagnosis.

In one example, the link traversal system 10, 10*a* and link traversal method 100 may be used across network element features. Certain features provided by a Software Defined Network (SDN) controller or a Network Management Suite (NMS) may operate on termination points 16$_n$ that span across different network elements. For example, an SDN Controller can provide a centralized implementation of Automatically Switched Optical Network (ASON) that requires service setup, alternate route calculation, and restoration. The SDN controller can utilize the link traversal method 100 to traverse the termination points $16_n$ in the optical network 12 spanning across different network elements to provide those services.

In one example, implementing the link traversal method 100 in one or more of the software features 26 within one or more of the network devices 14 to traverse termination points $16_n$ within the network devices 14 or across the network devices 14 in a Network Management Suite (NMS) or a Software Defined Network (SDN) controller provides flexibility to implement features operating on termination points $16_n$ spanning across network devices 14.

In one example, implementing the link traversal method 100 enables improved code maintainability due to decoupling of link level feature business logic and the link traversal mechanism. Further, the link traversal method 100 enables improved code reusability through the use of a generalized framework for traversing links for all feature managers. Additionally, once the traversal mechanism is verified for a particular software feature 26, the traversal mechanism will work for other software features 26, too, thereby improving error localization. Also, the link traversal method 100 enables easy extensibility of features across new types of termination points $16_n$ and interconnections, with reduced regression and a reduced risk of breaking existing code while extending.

In one example, implementing the link traversal method 100 enables traversing the network links 17 in upstream, downstream, or any custom directions through the optical network 12.

In one example, implementing the link traversal method 100 enables registering multiple feature managers 30 to traversers 32, thus resulting in the processing of multiple feature-specific data in a single pass.

Conclusion

Conventionally, systems required feature-specific implementation, modification and verification of the existing software feature modules. In addition, as the software feature modules were changed to add more and more network link specific code, readability and maintainability of the software feature business logic degraded. As a consequence, a new software feature could not reuse the software modules of any of the existing software features even if the software features operated on the same network, resulting in long lead-times for implementation of software features and difficulty in de-bugging implementations. The present disclosure addresses these and other deficiencies with systems and methodologies for feature-agnostic decoupled optical network link traversal for link-agnostic retrieval, propagation, and/or injection of information in heterogeneous networks.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Further, while implementations have been described in the context of an optical network, this need not be the case. These implementations may apply to an electronic network using copper cabling, or even a wireless network.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment.

What is claimed is:

1. A link traversal method, comprising the steps of:
    receiving, by a traverser software module for an optical network, from a first node in a network link defining a path in the optical network, one or more node sets indicative of one or more of a second node also in the network link defining the path in the optical network;
    determining, with the traverser software module, an order of traversal of the one or more node sets in the network link defining the path in the optical network;
    traversing the network link, including the first node and the one or more second node, using the determined order of traversal;
    communicating, by the traverser software module, information with a feature manager software module for a first software feature, the first software feature configured to perform a function specific to a specific node; and
    triggering, by the feature manager software module, the first software feature to execute one or more computer executable instruction based on information from the traverser software module,
    wherein the feature manager software module is a first feature manager software module, and further comprising the steps of:
    registering, with the traverser software module, the first feature manager software module and a second feature manager software module for a second software feature, the second software feature configured to perform a function specific to a specific node, the function different than the function of the first software feature; and
    communicating, by the traverser software module, information with the second feature manager software module.

2. The link traversal method of claim 1, further comprising the step of:
    maintaining, by the traverser software module, information regarding a set of nodes previously traversed such that a particular termination point is only traversed once for a particular traversal.

3. A link traversal method,
    comprising the steps of:
    receiving, by a traverser software module for an optical network, from a first node in a network link defining a path in the optical network, one or more node sets indicative of one or more of a second node also in the network link defining the path in the optical network;
    determining, with the traverser software module, an order of traversal of the one or more node sets in the network link defining the path in the optical network;
    traversing the network link, including the first node and the one or more second node, using the determined order of traversal;

communicating, by the traverser software module, information with a feature manager software module for a first software feature, the first software feature configured to perform a function specific to a specific node; and triggering, by the feature manager software module, the first software feature to execute one or more computer executable instruction based on information from the traverser software module, wherein the feature manager software module is a first feature manager software module, and further comprising the steps of:

communicating, by the traverser software module with a second feature manager software module for a second software feature, the second software feature configured to perform a function specific to a specific node, the function different from the function of the first software feature; and instigating, by the second feature manager software module, the second software feature to execute one or more computer executable instruction based on information from the traverser software module.

4. The link traversal method of claim 1, wherein the traverser software module is executed by a control module in the first node.

5. The link traversal method of claim 1, wherein the traverser software module is executed by a computer processor external to the first node.

6. The link traversal method of claim 1, wherein the feature manager software module is executed by a control module in the first node.

7. The link traversal method of claim 1, wherein the feature manager software module is executed by a computer processor external to the first node.

8. A link traversal system, comprising:
a first network hardware device, in a network link defining a path in an optical network, comprising a control module and one or more first termination point, the control module configured to execute a traverser software module and a first feature manager software module for a first software feature, the first software feature configured to perform a function specific to a specific termination point and/or a specific network device, wherein the traverser software module is configured to:
receive, from the first termination point of the first network hardware device, one or more node sets indicative of one or more of a second termination point and a second network hardware device also in the network link defining the path in the optical network;
determine an order of traversal of the first and the second termination points in the network link defining the path in the optical network based at least in part on the one or more node sets;
traverse the network link, including at least the first termination point and the one or more second termination point in the network link defining the path in the optical network, using the determined order of traversal;
communicate information to the first feature manager software module; and
wherein the first feature manager software module is configured to trigger the first software feature module to execute one or more computer executable instruction based on information communicated from the traverser software module, wherein the traverser software module being configured to communicate with the first feature manager software module, further comprises the traverser software module being configured to transmit one or more messages from the traverser software module on the first network hardware device to a second traverser software module on a second network hardware device.

9. The link traversal system of claim 8, wherein the traverser software module is further configured to receive one or more messages from a second traverser software module on a second network hardware device.

10. The link traversal system of claim 8, wherein the traverser software module is further configured to transmit the one or more messages to the feature manager software module.

11. A link traversal system, comprising:
a first network hardware device, in a network link defining a path in an optical network, comprising a control module and one or more first termination point, the control module configured to execute a traverser software module and a first feature manager software module for a first software feature, the first software feature configured to perform a function specific to a specific termination point and/or a specific network device, wherein the traverser software module is configured to:
receive, from the first termination point of the first network hardware device, one or more node sets indicative of one or more of a second termination point and a second network hardware device also in the network link defining the path in the optical network;
determine an order of traversal of the first and the second termination points in the network link defining the path in the optical network based at least in part on the one or more node sets;
traverse the network link, including at least the first termination point and the one or more second termination point in the network link defining the path in the optical network, using the determined order of traversal;
communicate information to the first feature manager software module; and
wherein the first feature manager software module is configured to trigger the first software feature module to execute one or more computer executable instruction based on information communicated from the traverser software module,
wherein the termination point comprises one or more feature manager software module, and wherein the traverser software module is further configured to transmit one or more functions to the one or more feature manager software module of the termination point.

12. A link traversal system, comprising:
one or more computer processor running a traverser software module and a first feature manager software module that when executed cause the one or more computer processor to:
receive, with the traverser software module, from a first node in a network link defining a path in an optical network, one or more node sets indicative of one or more of a second node also in the network link defining the path in the optical network;
determine, with the traverser software module, an order of traversal of the first and the second nodes in the network link defining the path in the optical network based at least in part on the one or more node sets;

traverse, with the traverser software module, the network link using the determined order of traversal;
communicate, with the traverser software module, with the first feature manager software module; and
trigger, with the first feature manager software module, the first software feature to execute one or more computer executable instruction based on information from the traverser software module in the first node and in the second node,
wherein the one or more computer processor is running a second feature manager software module and wherein when executed further cause the one or more computer processor to:
register, with the traverser software module, the first feature manager software module and a second feature manager software module for a second software feature, the second software feature configured to perform a function specific to a specific node, the function different than the function of the first software feature; and
communicate, by the traverser software module, information with the second feature manager software module.

13. The link traversal system of claim 12, wherein the first node is a network hardware device.

14. The link traversal system of claim 12, wherein the first node is a termination point of a network hardware device.

15. The link traversal system of claim 12, wherein the second node is a network hardware device.

16. The link traversal system of claim 12, wherein the second node is a termination point of a network hardware device.

17. A link traversal system, comprising:
one or more computer processor running a traverser software module and a first feature manager software module that when executed cause the one or more computer processor to:
receive, with the traverser software module, from a first node in a network link defining a path in an optical network, one or more node sets indicative of one or more of a second node also in the network link defining the path in the optical network;
determine, with the traverser software module, an order of traversal of the first and the second nodes in the network link defining the path in the optical network based at least in part on the one or more node sets;
traverse, with the traverser software module, the network link using the determined order of traversal;
communicate, with the traverser software module, with the first feature manager software module; and
trigger, with the first feature manager software module, the first software feature to execute one or more computer executable instruction based on information from the traverser software module in the first node and in the second node,
wherein the one or more computer processor running the traverser software module and the first feature manager software module that when executed further cause the one or more computer processor to maintain, by the traverser software module, information regarding a set of nodes previously traversed such that a particular termination point is only traversed once for a particular traversal.

* * * * *